(12) United States Patent
Srinivasan

(10) Patent No.: US 8,275,107 B2
(45) Date of Patent: Sep. 25, 2012

(54) TECHNIQUES FOR MANAGING A MULTIMEDIA CONFERENCE CALL

(75) Inventor: Srivatsa K. Srinivasan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1207 days.

(21) Appl. No.: 11/724,101

(22) Filed: Mar. 14, 2007

(65) Prior Publication Data

US 2008/0226051 A1 Sep. 18, 2008

(51) Int. Cl.
*H04M 3/42* (2006.01)

(52) U.S. Cl. ......... 379/202.01; 379/203.01; 379/204.01; 379/205.01

(58) Field of Classification Search ............. 379/202.01, 379/201.01, 205.01, 206.01, 203.01, 204.01; 709/204
See application file for complete search history.

(56) References Cited

U.S. PATENT DOCUMENTS

| | | | |
|---|---|---|---|
| 5,506,837 A | 4/1996 | Sollner et al. | |
| 6,477,150 B1 | 11/2002 | Maggenti et al. | |
| 6,907,449 B2 | 6/2005 | Srinivasan | |
| 6,944,137 B1 | 9/2005 | Pan et al. | |
| 6,982,961 B2 | 1/2006 | Refai et al. | |
| 2002/0078150 A1 | 6/2002 | Thompson et al. | |
| 2005/0130638 A1 | 6/2005 | Schrader | |
| 2006/0069726 A1 | 3/2006 | McKibben et al. | |
| 2006/0189337 A1 | 8/2006 | Farrill et al. | |
| 2007/0106724 A1* | 5/2007 | Gorti et al. ..................... 709/204 |

OTHER PUBLICATIONS

Adesemowo, et al., "Affective Gesture Feedback Instant Messaging on Handheld", http://people.cs.uct.ac.za/~btucker/publications/2004/AdesemowoTucker-3G2004.pdf.
Johnson, et al., "MobileEssence: Meeting Capture on Smartphones", Date: 2006, http://delivery.acm.org/10.1145/1160000/1152275/p262-johnson.pdf?key1=1152275&key2=0712097611&coll=GUIDE&dl=GUIDE&CFID=8283326&CFTOKEN=50081254.
Schmandt, et al., "Mediated Voice Communication via Mobile IP", Date: Oct. 2002, vol. 4, Issue: 2, http://delivery.acm.org/10.1145/580000/572005/p141-schmandt.pdf?key1=572005&key2=5987097611&coll=GUIDE&dl=GUIDE&CFID=8288414&CFTOKEN=81947770.

* cited by examiner

*Primary Examiner* — Thjuan K Addy

(57) ABSTRACT

Techniques include managing a multimedia conference call. An apparatus may comprise a wireless device having at least one wireless transceiver and a conference call manager module. The conference call manager module may establish a voice connection and a data connection for a multimedia conference call using the wireless transceiver, the voice connection to communicate media information and the data connection to communicate conference call event information during the multimedia conference call.

19 Claims, 3 Drawing Sheets

200

RECEIVE A REQUEST TO JOIN A CONFERENCE CALL BY ACTIVATING A SINGLE USER INTERFACE SELECTION ITEM HAVING CONFERENCE CALL CONNECTION INFORMATION
202

ESTABLISH A FIRST CONNECTION TO A CONFERENCE BRIDGE USING THE CONFERENCE CALL CONNECTION INFORMATION IN RESPONSE TO THE REQUEST
204

ESTABLISH A SECOND CONNECTION TO A SERVER USING THE CONFERENCE CALL CONNECTION INFORMATION IN RESPONSE TO THE REQUEST
206

RECEIVE MEDIA INFORMATION FROM THE CONFERENCE BRIDGE OVER THE FIRST CONNECTION AND CONFERENCE CALL EVENT INFORMATION FROM THE SERVER OVER THE SECOND CONNECTION DURING THE CONFERENCE CALL
208

FIG. 2

TECHNIQUES FOR MANAGING A MULTIMEDIA CONFERENCE CALL

BACKGROUND

A conference call system may allow multiple participants to substantially simultaneously communicate voice, video and data information during a call session. Managing multiple participants for a conference call, however, may be difficult for a number of reasons, particularly when using a cellular telephone. For example, some conference systems require entry of a sequence of digits that are received as dual-tone multi-frequency (DTMF) tones, such as a conference bridge number, a participant passcode, a leader passcode, and so forth. Locating and entering such information may be a tedious and time-consuming process for many users. Furthermore, information about the conference call may be limited, and in some cases, provided only upon request. Consequently, there may be a substantial need for improved conference call techniques to solve these and other problems in a device or network.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Various embodiments may be generally directed to techniques for managing a multimedia conference call. Some embodiments may be particularly directed to improved multimedia conference call techniques for a wireless communication system, such as a cellular radiotelephone system. In one embodiment, for example, a wireless device such as a cellular telephone may include one or more wireless transceivers and a conference call manager module. The conference call manager module may be arranged to automatically establish a first connection and a second connection for a multimedia conference call using the one or more wireless transceivers in response to activation of a single user interface selection item having conference call connection information. The first connection may be used to communicate media information during the multimedia conference call. The second connection may be used to communicate conference call event information during the multimedia conference call. In this manner, an operator or user may seamlessly participate and/or manage conference call operations using a conference call interface designed to improve user efficiency and productivity. Other embodiments are described and claimed.

BRIEF DESCRIPTION OF THE DRAWINGS

FIG. 2 illustrates one embodiment of a logic flow.

DETAILED DESCRIPTION

Figure 1:
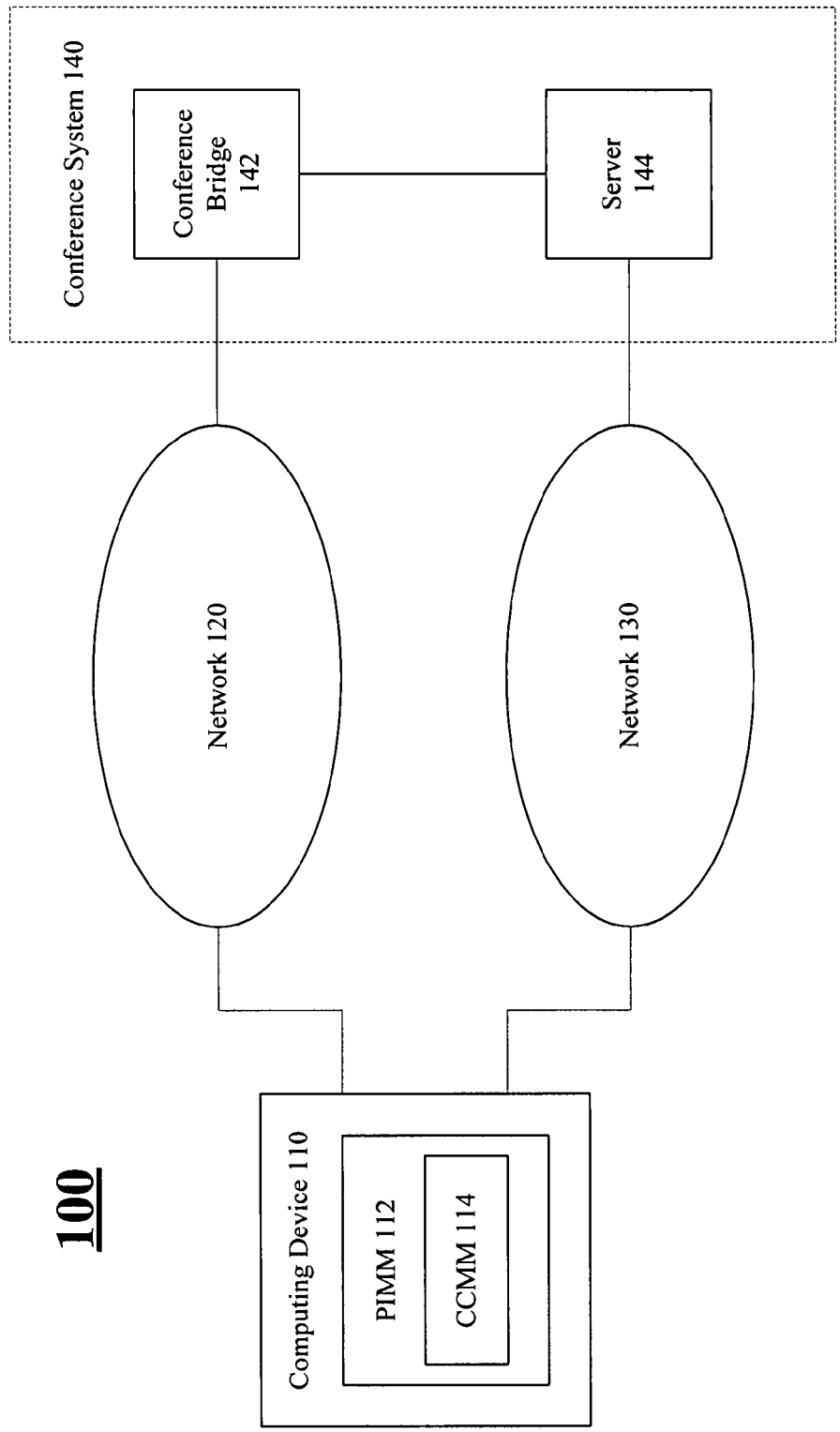
FIG. 1 illustrates one embodiment of a communication system.

Various embodiments may comprise one or more elements. An element may comprise any feature, characteristic, structure or operation described in connection with an embodiment. Examples of elements may include hardware elements, software elements, physical elements, or any combination thereof. Although an embodiment may be described with a limited number of elements in a certain arrangement by way of example, the embodiment may include more or less elements in alternate arrangements as desired for a given implementation. It is worthy to note that any references to "one embodiment" or "an embodiment" are not necessarily referring to the same embodiment.

Various embodiments may be directed to multimedia conference call management techniques for a cellular radiotelephone system. In one embodiment, for example, a wireless device such as a cellular telephone may include one or more wireless transceivers and a conference call manager module. The conference call manager module may be arranged to establish a first connection and a second connection for a multimedia conference call using the one or more wireless transceivers. The first connection may be used to communicate media information during the multimedia conference call. One example for the first connection may be a voice connection or voice channel. Examples of media information may include voice, video or data information. The second connection may be used to communicate conference call event information during the multimedia conference call. One example of a second connection may be a data connection or data channel. Examples of conference call event information may include context information, participant information or supplemental information for the multimedia conference call.

In one embodiment, for example, the conference call manager module may establish the first and second connections in response to activation of a single user interface selection item having conference call connection information. The wireless device may include a user interface module and a display. The user interface module may generate a single user interface selection item having conference call connection information. Examples of conference call connection information may include, but are not necessarily limited to, a conference bridge number, a participant passcode, a leader passcode, a uniform resource locator (URI), a uniform resource locator (URL), a network address, a telephone number, and so forth. The single user interface selection item may be implemented as, for example, a graphic user interface (GUI) symbol, icon, image, animation, link, hyperlink, button and so forth. The display may be used to display the single user interface selection item for an operator. The operator may select or activate the displayed single user interface selection item to cause the conference call manager module to establish the first and second connections for a multimedia conference call. In this manner, an operator or user may establish and participate in a multimedia conference call in a more efficient and effective manner.

FIG. 1 illustrates a block diagram of a communications system 100. The communications system 100 may represent a wireless communication system. As shown in FIG. 1, one embodiment of the communications system 100 may include a mobile station 110 communicatively coupled to networks 120, 130. The mobile station 110 may include, among other elements, a personal information manager module (PIMM) 112 and a conference call manager module (CCMM) 114. The networks 120, 130 may be communicatively coupled to a conference system 140. The conference system 140 may include, among other elements, a conference bridge 142 communicatively coupled to a server 144.

As used herein the term "module" may include any structure implemented using hardware elements, software elements, or a combination of hardware and software elements. In one embodiment, for example, the modules described herein are typically implemented as software elements stored in memory and executed by a processor to perform certain defined operations. It may be appreciated that the defined operations, however, may be implemented using more or less modules as desired for a given implementation. It may be further appreciated that the defined operations may be implemented using hardware elements based on various design and performance constraints. The embodiments are not limited in this context.

In one embodiment, for example, the communications system 100 may be implemented as a cellular radiotelephone system. Examples of cellular radiotelephone systems include those systems as defined by one or more standards promulgated by the Third Generation Partnership Project (3GPP) organization. Examples of such technologies and standards include Global System for Mobile Communications (GSM), Universal Mobile Telecommunications System (UMTS), General Packet Radio Service (GPRS), High Speed Downlink Packet Access (HSDPA), High Speed Uplink Packet Access (HSUPA), Long Term Evolution (LTE), High Speed Orthogonal Frequency Division Multiplexing Packet Access (HSOPA), and so forth. Examples of other cellular radiotelephone systems may include Code Division Multiple Access (CDMA) systems, North American Digital Cellular (NADC) systems, Time Division Multiple Access (TDMA) systems, Extended-TDMA (E-TDMA) systems, Narrowband Advanced Mobile Phone Service (NAMPS) systems, third generation (3G) systems such as Wide-band CDMA (WCDMA), CDMA-2000, and so forth. The embodiments are not limited to implementations for a particular cellular radiotelephone system.

In various embodiments, the mobile station 110 may comprise a mobile wireless device arranged to communicate multimedia information, including voice and data information, using the cellular radiotelephone system. In one embodiment, for example, the mobile station 110 may be implemented as a cellular telephone, mobile computing device, laptop computer, ultra-laptop computer, handheld computer, consumer electronic device, personal digital assistant, combination cellular telephone and handheld computer, wireless station, subscriber station, and so forth. The embodiments are not limited in this context.

In various embodiments, the communications system 100 may be implemented as a cellular radiotelephone system arranged to provide both voice communications and data communications capabilities, as represented by respective networks 120, 130. In one embodiment, for example, the network 120 may represent equipment and infrastructure for providing voice communications for a cellular radiotelephone system. In one embodiment, for example, the network 130 may represent equipment and infrastructure for providing data communications for a cellular radiotelephone system. The particular cellular radiotelephone systems implemented for the networks 120, 130 may use the same or similar technology in some cases, and in other cases may use different technologies, as desired for a given implementation.

By way of example and not limitation, assume the communications system 100 is implemented as a GSM with General Packet Radio Service (GPRS) system (GSM/GPRS). In this case, the network 120 may comprise equipment and infrastructure such as a base station subsystem (BSS) and a network subsystem (NSS) for providing voice channels between various mobile stations, or a mobile station and a landline telephone via a Public Switched Telephone Network (PSTN). The network 130 may comprise equipment and infrastructure such as a GPRS core network having a Serving GPRS Support Node (SGSN) and Gateway GPRS Support Node (GGSN) connected to a data or packet network, such as the Internet or an enterprise network for a business entity, for example.

In various embodiments, the communications system 100 may include a conference system 140. The conference system 104 may allow multiple participants to communicate substantially simultaneously for a multimedia conference call. In one embodiment, for example, the conference system 140 may include a conference bridge 142 and a server 144. The conference bridge 142 may be used for providing conference call functionality for circuit-switched networks, such as the PSTN. The server 144 may be used for providing conference call functionality for packet-switched networks, such as an Internet Protocol (IP) based network such as the Internet. Although the conference bridge 142 and the server 144 are shown as separate equipment, it may be appreciated that the conference system 140 may combine operations for both sets of equipment into a single integrated unit as desired for a given implementation. For example, the conference bridge 142 and the server 144 may be integrated into a single a multipoint conferencing unit (MCU). The embodiments are not limited in this context.

In various embodiments, the server 144 may implement one or more control or signaling protocols as defined by one or more standards organizations. In one embodiment, for example, the server 144 may implement a signaling protocol as defined and promulgated by the Internet Engineering Task Force (IETF) standards organization, such as the Session Initiation Protocol (SIP), as defined by the IETF series RFC 3261, 3265, 3853, 4320 and progeny, revisions and variants.

In general, the SIP signaling protocol is an application-layer control and/or signaling protocol for creating, modifying, and terminating sessions with one or more participants. These sessions include IP telephone calls, multimedia distribution, and multimedia conferences. The IP telephone calls may be telephone calls communicated over an IP network such as the Internet using packet-switching technology. The IP telephone calls are sometimes referred to as IP telephony, Voice Over Packet (VOP) or Voice Over IP (VoIP) telephone calls.

In particular, the server 144 and the mobile station 110 may be arranged to communicate and process the SIP signaling protocol information and signals representing call state events for a multimedia conference call, such as those call state events defined by the IETF RFC 3265 titled "Session Initiation Protocol (SIP) Specific Event Notifications," June 2002, including any progeny, revisions and variants. In accordance with the IETF RFC 3265, entities such as the mobile station 110 in a network can subscribe to resource or call state for various resources or calls in the network, and those entities (or entities acting on their behalf) can send notifications when those states change. Examples of call state events may include a participant joining a call, a participant leaving a call, a time remaining, call terminated, subscription terminated, and so forth. A typical example of a flow of messages between a subscriber (e.g., the mobile station 110) and a notifier (e.g., the server 144) would be for the subscriber to send a subscribe message to request state subscription to the notifier, the notifier to send an acknowledge message to acknowledge subscription to the subscriber, and the notifier to send one or more notify messages to return current state information to the subscriber. In some cases, subscriptions may be expired over time and therefore should be refreshed by subsequent subscribe messages.

In various embodiments, the mobile station 100 may include one or more wireless transceivers. In some cases, the mobile station may have a single radio or wireless transceiver for both voice and data communications. In other cases, the mobile station may have multiple radios or transceivers, with a first transceiver for voice communications and a second transceiver for data communications.

In various embodiments, the mobile station 100 may include the PIMM 112. The PIMM 112 may comprise any personal information management application program such as a calendar application program. An example of a calendar application program may include a MICROSOFT® OUTLOOK calendar application program, as made by MICROSOFT Corporation, Redmond, Wash. In addition to managing conventional calendaring data, the PIMM 112 may be used to store and display conference call connection information. Conference call connection information may comprise any information needed to establish a multimedia conference call over the mobile station 110. In one embodiment, for example, the multimedia conference call may have multiple connections, including a voice connection and a data connection. Consequently, the conference call connection information may store a first set of conference call connection information for setting up and establishing a voice connection, and a second set of conference call connection information for setting up and establishing a data connection. Examples of conference call connection information to establish the voice connection may include, but are not necessarily limited to, a telephone number, a conference bridge number, a participant passcode, a leader passcode, device identifier, operator identifier, and so forth. Examples of conference call connection information to establish the data connection may include, but are not necessarily limited to, a device address, network address, IPv4 address, IPv6 address, media access control (MAC) address, URI, URL, server identifier (ID), conference server ID, SIP ID, SIP address, authentication information, security information, certificates, and so forth.

In various embodiments, the mobile station 100 may include the CCMM 114. The CCMM 114 may be arranged to establish and manage multiple connections for the multimedia conference call using the networks 120, 130. For example, the CCMM 114 may be arranged to establish and manage a first connection and a second connection for a multimedia conference call using the one or more radios or wireless transceivers. One example for the first connection may be a voice connection or voice channel from the mobile station 110 to the conference bridge 142 of the conference system 140 via the network 120. One example of a second connection may be a data connection or data channel from the mobile station 110 to the server 144 of the conference system 140 via the network 130. Each connection may be used to communicate different types of information during the multimedia conference call. It may be appreciated that the first connection or voice connection may be established using traditional cellular radiotelephone system techniques, including a circuit-switched connection or a packet-switched connection. It may be further appreciated that the conference bridge 142 and the server 144 may be integrated into a single MCU, thereby having both connections terminating at the same device.

In one embodiment, for example, the first connection or voice connection may be used to communicate media information during the multimedia conference call. Examples of media information may include the media content typically communicated by participants during the conference call, such as speech, speech utterances, noise information, background information, voice information, audio information, and so forth.

In one embodiment, for example, the second connection or data connection may be used to communicate conference call event information during the multimedia conference call.

Examples of conference call event information may include any information about the conference call, including context information, participant information, supplemental information, and any other desired set of information related to a conference call. Examples of context information may include any general information about the conference call, such as duration of a call, time remaining for a call, time extension procedures, and so forth. Examples of participant information may include any general information about the participants, such as the number of participants for a call, when a participant joins or leaves a call, location information for a participant, an active speaker for a call, a leader for the call, and so forth. Examples of supplemental information may include any particular information for a given conference call, such as a call agenda, presentation materials, slides, audio recordings, video recordings, documents, and so forth. These are merely a few examples, and the amount and type of conference call event information may include any defined events or information as desired for a given implementation. The embodiments are not limited in this context.

In one embodiment, for example, the mobile station 110 and the server 144 may be arranged to communicate in accordance with the SIP Standard. In this case, a system designer or architect may define a set of desired conference call event information for the server 144 and the CCMM 114 as a SIP event package based on the SUBSCRIBE and NOTIFY messages previously described. This may be accomplished, for example, using event template-packages. Normal event packages define a set of state applied to a specific type of resource, such as user presence, call state, and messaging mailbox state. Event template-packages are a special type of package that defines a set of state applied to other packages, such as statistics, access policy, and subscriber lists.

In one embodiment, for example, the conference call manager module may establish the first and second connections in response to activation of a single user interface selection item having conference call connection information. The wireless device may include a user interface module and a display. For example, the user interface module may be integrated with, or separate from, an operating system (OS) for the mobile station 110. The user interface module may generate a single user interface selection item having conference call connection information for both the voice connection and the data connection. The single user interface selection item may be implemented as, for example, a GUI symbol, icon, image, animation, link, hyperlink, button or any other GUI item that is suitable for viewing and item selection by an operator or user. The display may be used to display the single user interface selection item for an operator. The operator may select or activate the displayed single user interface selection item to cause the conference call manager module to establish the first and second connections for a multimedia conference call. For example, if the mobile station 110 utilizes a touch screen display, the operator may join a conference call by selecting a hyperlink for the conference call. Once selected or activated, the CCMM 114 may establish both connections using the conference call connection information, thereby avoiding the need for the operator to enter the conference call connection information manually. This may allow the operator to automatically join a conference call from the mobile station 110 while reducing user operations, thereby facilitating use of the mobile station 110 while traveling or for one-handed operations.

Operations for the communications system 100 may be further described with reference to one or more logic flows. It may be appreciated that the representative logic flows do not necessarily have to be executed in the order presented, or in any particular order, unless otherwise indicated. Moreover, various activities described with respect to the logic flows can be executed in serial or parallel fashion. The logic flows may be implemented using one or more elements of the communications system 100 or alternative elements as desired for a given set of design and performance constraints.

FIG. 2 illustrates a logic flow 200. Logic flow 200 may be representative of the operations executed by one or more embodiments described herein. As shown in FIG. 2, the logic flow 200 may receive a request to join a conference call by activating a single user interface selection item having conference call connection information at block 202. The logic flow 200 may establish a first connection to a conference bridge using the conference call connection information in response to the request at block 204. The logic flow 200 may establish a second connection to a server using the conference call connection information in response to the request at block 206. The logic flow 200 may receive media information from the conference bridge over the first connection and conference call event information from the server over the second connection during the conference call at block 208. The embodiments are not limited in this context.

The various operations of the communications system 100 and the logic flow 200 may be further described by way of example. Assume an operator desires to attend a conference call using the mobile station 110. Typically, the operator needs to enter various types of information, including a bridge line telephone number, a meeting passcode, delimiter keys, participant name, leader code, and so forth. This may be tedious or time-consuming for the operator. The CCMM 114 of the mobile station 110 provides the ability for the operator to join a conference with "one click" and have certain conference information delivered to the user via a data channel, while participating in the conference call via a voice channel. As the conference progresses, meeting information and other attendee join/leave information is sent in real-time over the data channel(s) established to the server 144 on the network 130, such as an IP network. Other information may include who the active speaker is in the conference, displaying a photo or video of the active speaker, and so forth.

This may be achieved by utilizing the intelligent operations of the CCMM 114 on the mobile station 110 interacting with any calendaring functionality exposed within the mobile station 110, such as the PIMM 112. With a single click experience, an operator or user may join the conference with improved efficiency and reduced effort. The single click experience may be configured and presented via MICROSOFT OUTLOOK or some other calendaring function in the mobile station 110. Furthermore, the mobile station 110 may subscribe for conference call event information to an entity sitting on an IP network, such as the server 144, such that the mobile station 110 may render all relevant information to the user including attendee join/leave information and other relevant information such as the most active speaker. The user may connect to the conference system 140 using the single user interface selection item. In addition to the conference call connection information for the audio portion of the conference call, the PIMM 112 would also store a SIP URI on the public IP network such as the Internet that identifies information for the specific conference call, such as agenda items, action required or task lists, links to documentation such as RFC discussed, and so forth. When a user clicks on the single user interface selection item displayed by MICROSOFT OUTLOOK in order to join the conference, the mobile station 110 would dial-out to the conference bridge 142 and in parallel would subscribe to the conference event package with proper credentials to get conference information from the server 144. Once the data channel succeeds via the network 130, the mobile station 110 starts to receive SIP conference notifications containing all or part of the conference information. The conference information may include participant information such as a display name, email address and other contact information as needed; conference information such as conference agenda and other details specific to the conference; and information about who is currently speaking.

Figure 3:
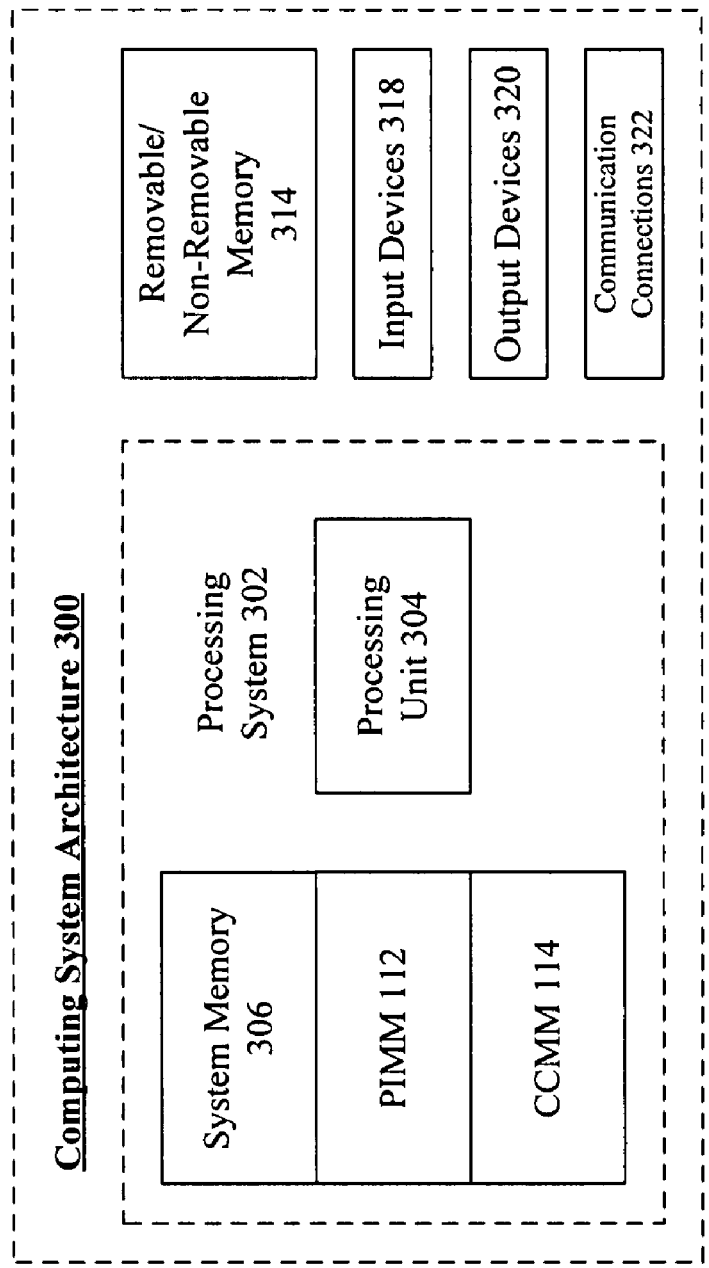
FIG. 3 illustrates one embodiment of a computing system architecture.

FIG. 3 illustrates a computing system architecture 300. The computing system architecture 300 may represent a general system architecture suitable for implementing various embodiments, such as the mobile station 110, for example. As shown in FIG. 3, the computing system architecture 300 may include multiple elements, including hardware elements, software elements, or software and hardware elements. Although the computing system architecture 300 as shown in FIG. 3 has a limited number of elements in a certain topology, it may be appreciated that the computing system architecture 300 may include more or less elements in alternate topologies as desired for a given implementation. The embodiments are not limited in this context.

In various embodiments, the computing system architecture 300 typically includes a processing system of some form. In its most basic configuration, the computing system architecture 300 may include a processing system 302 having at least one processing unit 304 and system memory 306. Processing unit 304 may include one or more processors capable of executing software, such as a general-purpose processor, a dedicated processor, a media processor, a controller, a microcontroller, an embedded processor, a digital signal processor (DSP), and so forth. System memory 306 may be implemented using any machine-readable or computer-readable media capable of storing data, including both volatile and non-volatile memory. For example, system memory 306 may include read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information.

As shown in FIG. 3, system memory 306 may store various software programs. For example, the system memory 306 may store one or more application programs and accompanying data, such as the PIM 112 and the conference call manager 114 as previously described. In another example, the system memory 306 may store one or more OS and accompanying data. An OS is a software program that manages the hardware and software resources of a computer. An OS performs basic tasks, such as controlling and allocating memory, prioritizing the processing of instructions, controlling input and output devices, facilitating networking, managing files, and so forth. Examples of a suitable OS for the computing system architecture 300 may include one or more variants of MICROSOFT® WINDOWS®, as well as others.

The computing system architecture 300 may also have additional features and/or functionality beyond processing system 302. For example, the computing system architecture 300 may have one or more flash memory units 314. In another example, the computing system architecture 300 may also have one or more input devices 318 such as a keyboard, mouse, pen, voice input device, touch input device, and so forth. In yet another example, the computing system architecture 300 may further have one or more output devices 320, such as a display, speakers, printer, and so forth. In still another example, the computing system architecture 300 may also include one or more communications connections 322. It may be appreciated that other features and/or functionality may be included in the computing system architecture 300 as desired for a given implementation.

In various embodiments, the computing system architecture 300 may further include one or more communications connections 322 that allow the computing system architecture 300 to communicate with other devices. Communications connections 322 may include various types of standard communication elements, such as one or more communications interfaces, network interfaces, network interface cards, radios, wireless transceivers, wired and/or wireless communication media, physical connectors, and so forth. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media. The terms machine-readable media and computer-readable media as used herein are meant to include both storage media and communications media.

In various embodiments, the computing system architecture 300 may further include one or more memory units 314. Memory unit 314 may comprise any form of volatile or non-volatile memory, and may be implemented as either removable or non-removable memory. Examples of memory unit 314 may include any of the memory units described previously for system memory 306, as well as others. The embodiments are not limited in this context.

In some cases, various embodiments may be implemented as an article of manufacture. The article of manufacture may include a storage medium arranged to store logic and/or data for performing various operations of one or more embodiments. Examples of storage media may include, without limitation, those examples as previously provided for the memory units 306, 314. In various embodiments, for example, the article of manufacture may comprise a magnetic disk, optical disk, flash memory or firmware containing computer program instructions suitable for execution by a general purpose processor or application specific processor. The embodiments, however, are not limited in this context.

Various embodiments may be implemented using hardware elements, software elements, or a combination of both. Examples of hardware elements may include any of the examples as previously provided for a logic device, and further including microprocessors, circuits, circuit elements (e.g., transistors, resistors, capacitors, inductors, and so forth), integrated circuits, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method, comprising: receiving a request to join a conference call by activating a single user interface selection item on a mobile station having conference call connection information; establishing a first connection from the mobile station to a conference bridge over a first type of communication channel using the conference call connection information in response to the request, the first type of communication channel comprising a voice channel; establishing a second connection from the mobile station to a server using the conference call connection information in response to the request; and receiving media information at the mobile station from the conference bridge over the first connection and conference call event information from the server over the second connection during the conference call.

2. The method of claim 1, comprising displaying the single user interface selection item with the conference call connection information from a personal information manager.

3. The method of claim 1, comprising establishing the second connection to a conference bridge over a second type of communication channel comprising a data channel.

4. The method of claim 1, comprising sending authentication information to the server to receive the conference call event information.

5. The method of claim 1, comprising receiving the conference call event information from the server over the second connection during the conference call as session initiation protocol conference notifications.

6. The method of claim 1, comprising receiving participant information from the server over the second connection during the conference call.

7. The method of claim 1, comprising receiving supplemental information from the server over the second connection during the conference call.

8. The method of claim 1, comprising receiving active speaker information from the server over the second connection during the conference call.

9. The method of claim 1, comprising retrieving a uniform resource identifier from the personal information manager to establish the second connection to the server.

10. An article of manufacture comprising a memory unit storage medium containing instructions that when executed cause a system to: receive a request to join a conference call by activating a single user interface selection item on a mobile station having conference call connection information; establish a voice connection from the mobile station to a conference bridge using the conference call connection information in response to the request; establish a data connection from the mobile station to a server using the conference call connection information in response to the request; and receive media information at the mobile station from the conference bridge over the voice connection and conference call event information from the server over the data connection.

11. The article of manufacture of claim 1 further comprising instructions that when executed cause the system to display the single user interface selection item with the conference call connection information from a calendar application.

12. The article of manufacture of claim 10, further comprising instructions that when executed cause the system to send authentication information to the server to receive the conference call event information.

13. The article of manufacture of claim 10, further comprising instructions that when executed cause the system to receive the conference call event information from the server over the data connection during the conference call as session initiation protocol conference notifications.

14. The article of manufacture of claim 10, further comprising instructions that when executed cause the system to receive context information, participant information or supplemental information from the server over the data connection during the conference call.

15. An apparatus comprising a wireless device having at least one wireless transceiver and a conference call manager module, the conference call manager module to establish from the wireless device a voice connection to a conference bridge and a data connection to a server for a multimedia conference call using the wireless transceiver, the voice connection to communicate and receive media information and the data connection to communicate conference call event information during the multimedia conference call.

16. The apparatus of claim 15, comprising a user interface module to generate a single user interface selection item having conference call connection information, the single user interface selection item to automatically establish the voice connection and the data connection when activated.

17. The apparatus of claim 15, comprising a display to display a single user interface selection item having conference call connection information, the single user interface selection item to automatically establish the voice connection and the data connection when activated.

18. The apparatus of claim 15, the transceiver and the conference call manager module to communicate and process control signals in accordance with a session initiation protocol.

19. The apparatus of claim 15, the conference call event information comprising context information, participant information or supplemental information for the multimedia conference call.

* * * * *